United States Patent [19]

Akasaka

[11] Patent Number: 5,166,721
[45] Date of Patent: Nov. 24, 1992

[54] CAMERA WITH COMPUTER CONTROL

[75] Inventor: Michiharu Akasaka, Hachioji, Japan

[73] Assignee: Konica Corporation, Tokyo, Japan

[21] Appl. No.: 810,446

[22] Filed: Dec. 19, 1991

Related U.S. Application Data

[63] Continuation of Ser. No. 645,360, Jan. 24, 1991, abandoned, which is a continuation of Ser. No. 418,072, Oct. 6, 1989, abandoned, which is a continuation of Ser. No. 269,093, Nov. 9, 1988, Pat. No. 4,982,220.

[30] Foreign Application Priority Data

Nov. 13, 1987 [JP] Japan .................. 62-286881
Nov. 13, 1987 [JP] Japan .................. 62-286884
Nov. 13, 1987 [JP] Japan .................. 62-286885

[51] Int. Cl.$^5$ .................................. G03B 13/36
[52] U.S. Cl. .................... 354/400; 354/267.1
[58] Field of Search ............ 354/267.1, 400, 402, 354/468, 105, 109

[56] References Cited

U.S. PATENT DOCUMENTS 4,466,721 8/1984 Detuzzi .................. 354/267.1
4,609,274 9/1986 Iwashita et al. ............ 354/267.1
4,678,304 7/1987 Kazumi .................... 354/267.1

Primary Examiner—Russell E. Adams
Attorney, Agent, or Firm—Finnegan, Henderson, Farabow, Garrett and Dunner

[57] ABSTRACT

In an electrical automatic camera capable of performing normal mode in which picture-taking operation is carried out one time for only one frame of photographic film and interval mode in which picture-taking operation is repeated for a given number of frames with a given interval, the invention provides battery-check circuit having at least two kinds of reference levels for comparing with current voltage level of battery, wherein the first reference level is used in the time of the normal mode and the second reference level is used in the time of the interval mode, and wherein the second reference level is set to be higher than the first reference level.

4 Claims, 7 Drawing Sheets

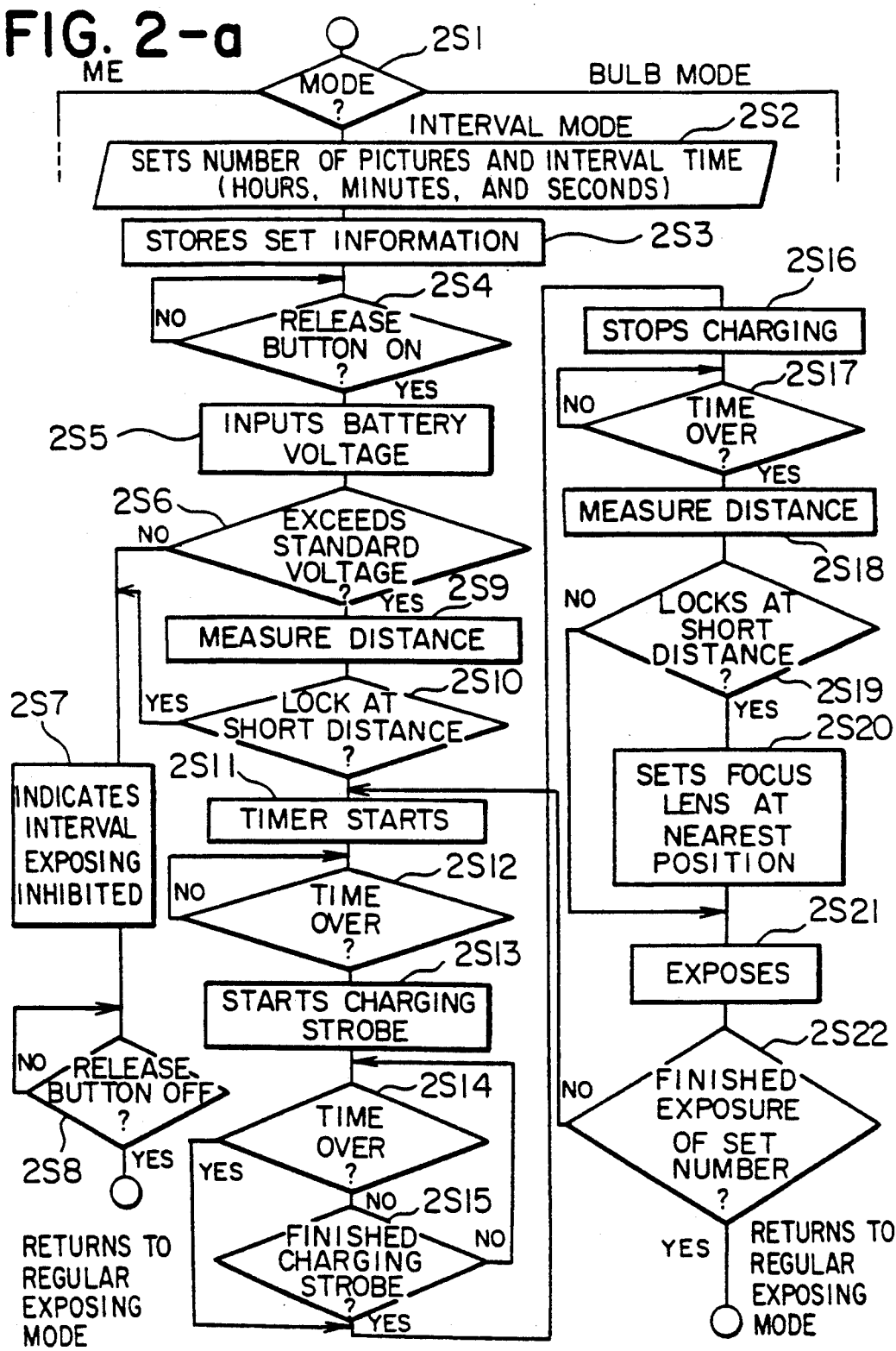
FIG. 2-a

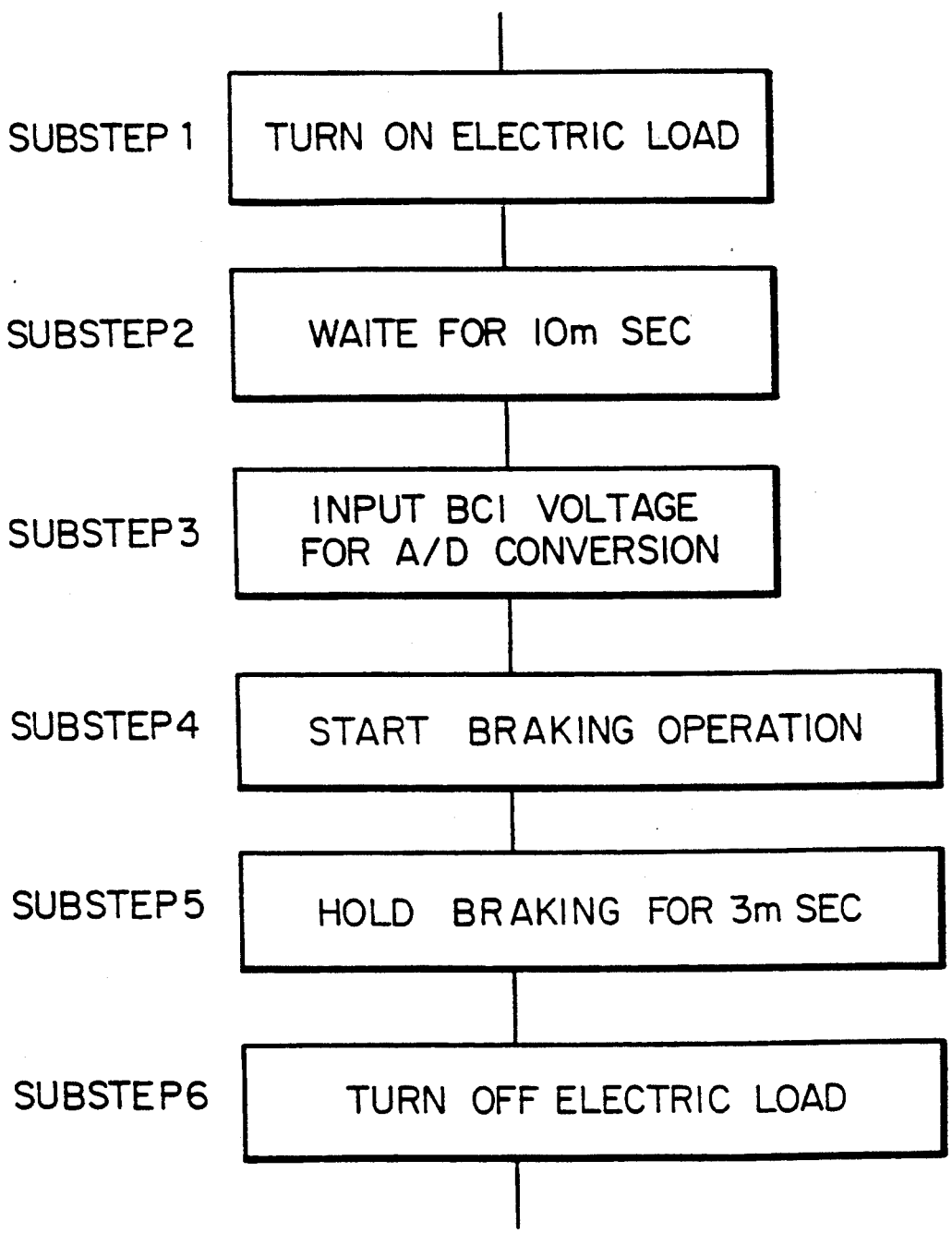
FIG. 2-b

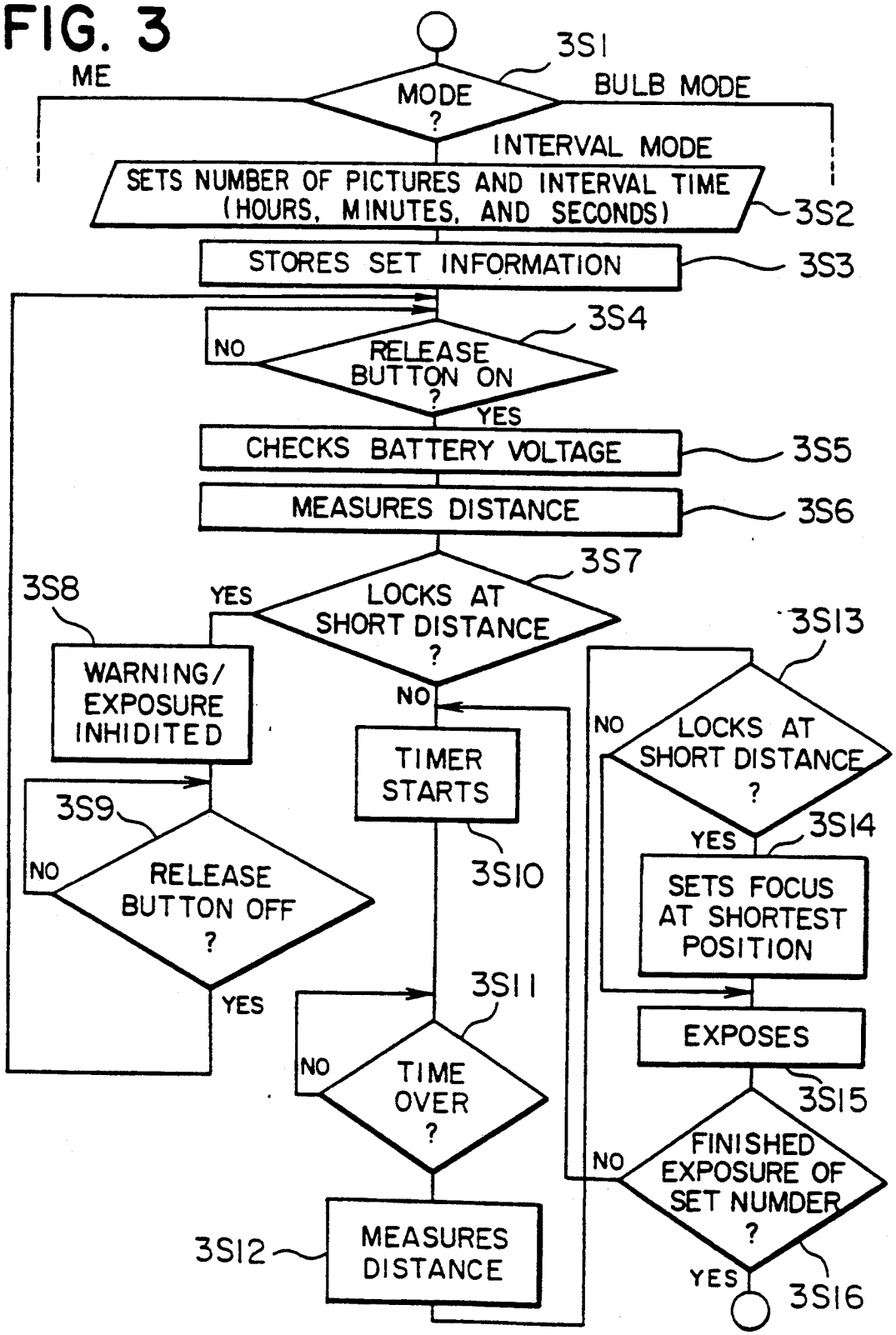

CAMERA WITH COMPUTER CONTROL

This application is a continuation, now abandoned, of application Ser. No. 07/645,360 filed Jan. 24, 1991, which is a continuation of Ser. No. 07/418,072 filed Oct. 6, 1989, now abandoned, which is a continuation of Ser. No. 07/269,093 filed Nov. 9, 1988, now U.S. Pat. No. 4,982,220.

BACKGROUND OF THE INVENTION

The present invention relates to an information display device for a camera, and in particular, to a liquid crystal display that displays exposure-related information and information that is imprinted into a film.

Most cameras of present age are electronically controlled and comprise microcomputers as vital elements as well as peripheral circuits and peripheral units, wherein various functions are provided for easy exposing operation and special effects.

FIG. 4 illustrates a circuit constitution of an electronically controlled camera according to the invention. To a microcomputer 11, ON/OFF signals are fed as control commands from various operation/control switches. These operation/control switches include contact switches 12 and 13 that are synchronous with an operation of a release button, and contact switches 14 and 15 that are synchronous with an operation of a zoom switch. Moreover, button switches 17 through 22 are provided to set an exposing mode, a display mode of a liquid crystal display 16, and a superimposing mode. Based on the ON/OFF signals from these operation/control switches, the microcomputer 11 performs various types of controlling. The peripheral circuits and units include a photometric IC device 23 and a photodiode 24 both for external luminance measurement; a shutter driving motor-control IC device 25 and a motor 26 both for driving and controlling the shutter; a focus lens driving control IC device 27 and a motor 28 both for shifting the focus lens to a focal position; a strobe control circuit 29 and a discharge tube 30 both for controlling flashing and discharging of the strobe; a focusing control circuit 31, an infrared light emitting diode 32, and a semiconductor-position detector (PSD) 33, each for detecting the distance to a subject; a zoom-lens driving control circuit 34 and a motor 35 both for shifting a group of movable lenses in the zoom lens to a position for an optimum focal distance; a film feed control circuit 36 and a motor 37 both for winding up or back a film; and a power circuit comprising a battery 38 and a power switch for a peripheral circuits.

These peripheral circuits respond to commands or control signals from the microcomputer 11, and return measurement signals and status signals to the microcomputer 11, whereby the microcomputer 11 performs programed controllings in order to acomplish the required exposing conditions. For example, once the release button is pressed, the microcomputer upon reception of an ON signal from the contact switch 12 controllingly performs photometry and range-finding, and then adjusts the position of the focus lens based on the resultant signals; and at the same time, the microcomputer verifies the shutter speed and chooses a status of the strobe. Upon reception of an ON signal generated by the actuation of a second-stage contact switch 13 on the release button, the microcomputer performs exposing by means of actuation of the shutter and controlled flashing of the strobe; and then, the film is wound up, and indications for film-winding status and film counter are updated at same time.

Prior to picture-taking, by the manipulation of a drive mode switch 21, the present exposure mode rotates from regular exposing mode to single exposure mode, continuous exposure mode, and self start mode; and it is indicated on the display. Depending on the manipulation of a function mode switch 19, one of the multiple exposure mode, bulb mode, and interval mode can be selected. After a relevant mode is selected, selection of a data change position with a select switch 18 and various data settings, such as a number of times for multiple exposure and interval time with an adjust switch 17, are performed.

Next, upon initiation of exposure control, appropriation of the power level of a battery 38 is to be checked. This checking procedure is achieved by A/D conversion of the voltage of the power switch 39, with the microcomputer 11 comparing with the reference voltage data. As described above, in a camera having battery checking means, check on the power level of the battery has been conventionally performed by comparing the power level with a specific reference voltage. Accordingly, even if the power level drops to a lowest permissible voltage, exposure control allows normal exposing. However, if the exposing mode is interval, a picture-taking operation possibly becomes impossible in the course of exposing. More specifically, in the interval mode, a predetermined number of frames are unconditionally subjected to exposing and film forwarding at predetermined, intervals. Therefore, even being at a proper level during first frame exposing, the power of the battery may drop to an impermissible level before exposing for the final frame. This voltage drop possibly results in immobilization or expersing defects such as being underexposed, and out of focus.

One possible measure to solve this problem is to set higher the lowest permissiblve voltage level. However, this measure judges that a battery comes to the end of its service life while it is still useful, and causes a waste of a useful battery.

The first object of the invention is to provide a battery check device that eliminates the waste of a useful battery and allows a reliable exposing in the interval mode.

Turning the interval exposure control mode, exposing and frame forwarding are automatically performed at predetermined time intervals until a predetermined number of pictures are taken. For focusing control in the interval exposure, the focal length is either fixed to the initial position, or readjusted for each frame. The fixed focusing has a problem; pictures are readily out of focus when they are taken of a movable subject such as an animal. This problem can be solved by the readjusting focus control. However, with the latter focus control, if a subject is within a minimum exposure range, a warning is issued and exposure is inhibited as well as a regular exposing. Accordingly, in the interval exposing, if a subject is within the minimum exposure range, the corresponding frame is not exposed (one frame skipped); therefore, problems such as the cause of unexposed frame is not detected and an unattended interval exposing, occurs.

One possible measure to solve this problem is to perform exposing with focus unlocked. However, this measure poses another problem that a photographer may fail to notice that the camera is set at an out-of-focus position and performs an interval exposing. As a result, all or almost of all the frames can be exposed out of focus.

The second object of the invention is to provide an interval exposure control device that eliminates skipped frames while decreasing the possibility of out-of-focus exposure.

Exposure related information such as selections of different kinds of mode, data settings, film frame position, bulb time, and interval time are indicated on the liquid crystal display (LCD) 16. The LCD 16 also indicates data such as a date being imprinted on a film. Namely, in the vicinity of film surface at the inside of camera is provided an internal liquid crystal indication part (not shown in the drawings) for indicating information to be exposed on the film. The indication controlling system of the microcomputer 11 is so constituted that the internal liquid crystal indication part is adapted to indicate the information identical with that of the liquid crystal display 16. FIG. 5 illustrates a display pattern on the LCD 16 that comprises display segments for single exposure mode "S", continuous exposure mode "M", multiple exposure mode "ME", bulb mode "Bulb", interval mode "INTV", and that also comprises a numerical display section N for displaying present film frame position and multiple exposure timing, and a multi-digit numerical display TN for time display of interval timer as well as for date display.

Information display on the LCD 16 is controlled by the microcomputer 11, wherein a same numerical indicator selectively displays the date from the imprinting information or left time at the bulb mode; or elapsed interval time. In the case of a display pad which has a part commonly used for plural indications, the indication of information such as date and time, is switched based on the present status of exposure control.

As described above, in a prior art information display device, which selectively displays exposure related information and imprinting information, the display normally displays exposure related information, and switches to imprinting information to be also displayed on the internal liquid crystal indication part for exposing it on the film surface once picture-taking control starts (a contact switch 12 on the release button is turned ON). Accordingly, a photographer cannot monitor the exposure related information while picture-taking control is working. For example, in the case of picture-taking in the interval mode, the numerical display section of the LCD 16 switches to the imprinting date after picture-taking control starts, and a photographer fails to monitor the interval time elapsed.

To solve the above-mentioned problem, one possible measure is to provide a different display for each item of information instead of a dual-purpose display. However, this constitution inevitably increases the number of display segments to be controlled, and a larger number of display drivers; it creates a complicated and expensive display system. Another possible measure is to provide display modes being changed by a switch operation after the initiation of exposure control. However, this measure inevitably increases the number of switches required or requires more complicated operation by a photographer.

The third object of the invention is to provide an information display device that eliminates the problem in regards with switching indication of exposure related information and imprinting information.

SUMMARY OF THE INVENTION

The first object of the invention is to provide a battery check device that eliminates the waste of useful batteries and provides reliable exposing in the interval mode. Accordingly, in a camera being capable of interval exposure operation, the invention sets higher the lowest permissible voltage level of the battery at the initiation of interval exposure operation than that of regular exposing operation. Thus, a battery voltage level required for the regular exposing operation is set at a different level than the interval exposure operation, whereby a necessary battery voltage level is maintained for each of these two operation modes, and, accordingly, the battery can be used until they are fully depleted.

The second object of the invention is to provide an interval exposure control device that eliminates skipped (unexposed) frames while decreasing the possibility of out-of-focus exposure. Accordingly, in a camera capable of interval exposure operation, the invention provides controlling means, such that if a signal indicates a subject within a minimum exposure range prior to the initiation of interval exposure controlling, it cancels the controlling and issues warning. If a similar signal occurs after the initiation of interval exposure control, the controlling means unconditionally adjusts the focal point to the minimum range and continues the exposure control; whereby if the interval exposure control is not started, the warning and the cancellation of controlling indicate the necessity of camera position change. If the internal exposure is started, exposure is performed with the focal point at the minimum range in order to eliminate skipping frames.

The third object of the invention is to provide an information, display device that eliminates a problem with regards to a switch of indication between exposure-related information (or a camera operation information) and imprinting information (a record information) to be imprinted onto a film.

A camera according to the invention comprises two pieces of LCDs (liquid crystal displays) and a display control means for selecting one of above informations and indicating the selected same information on both LCDs. The first one of the LCDs is located in the vicinity of the film surface at the inside of camera and record information is exposed onto the film through the indication displayed on the first LCD. The second one of the LCDs is located on the outside of the camera and the information displayed on the second LCD can be observed by a photographer.

Each of LCDs has a dual-purpose display section that is capable of selectively displaying either the record information or the camera operation information. The display control means allows the dual-purpose display section to indicate the camera operation information immediately before exposure on the film.

When the time left before actual exposure becomes near the response time necessary for the LCD to display information in response to a display signal, the display control means switches the indication from the camera operation information to the record information.

BRIEF DESCRIPTION OF THE DRAWINGS

FIGS. 1, 2a-2b and 3 are flow charts respectively illustrating a preferred embodiment of the main part of the invention.

DETAILED DESCRIPTION OF THE INVENTION

Figure 1:
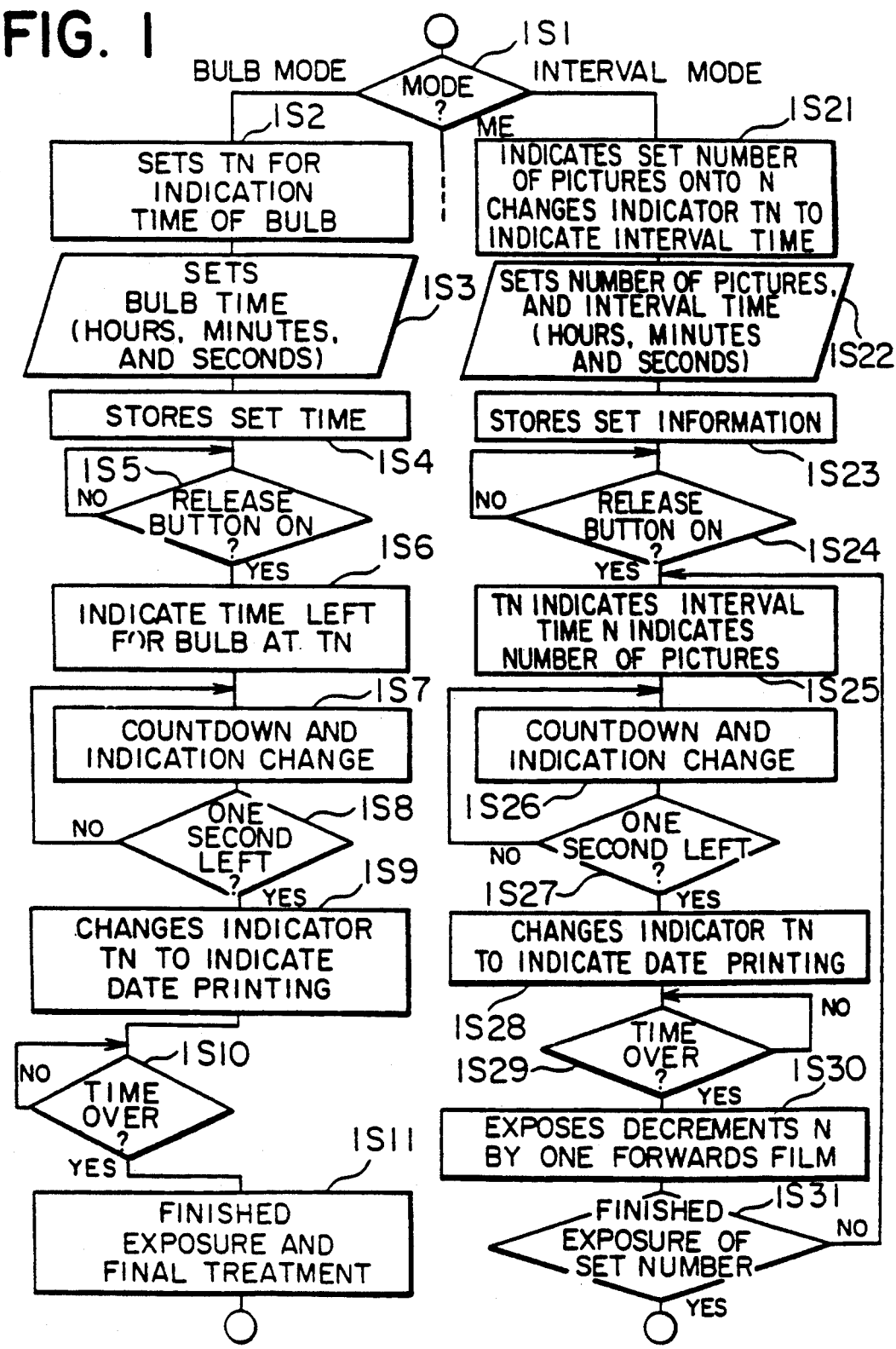
Figure 4:
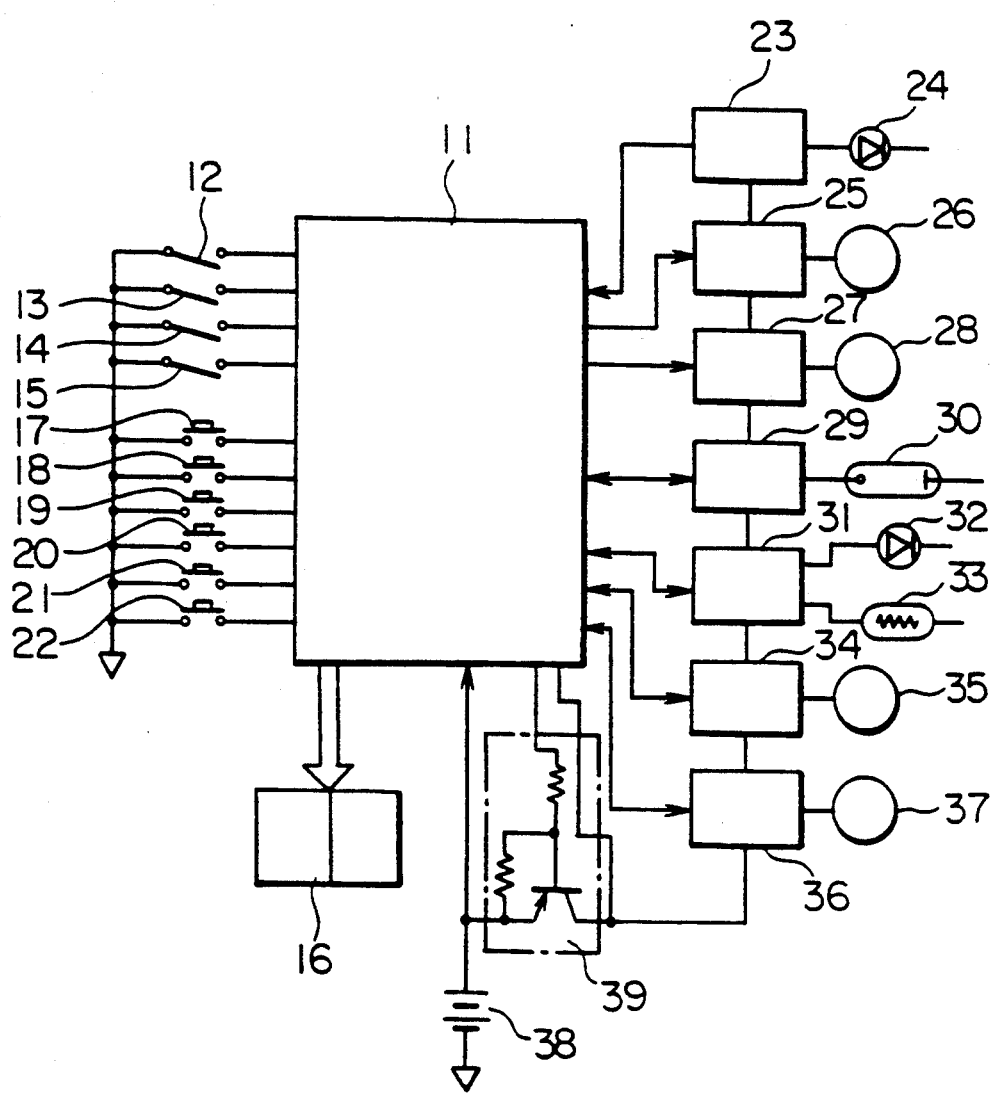
FIG. 4 is a constitution diagram of control device on an electronically controlled camera.
Figure 5:
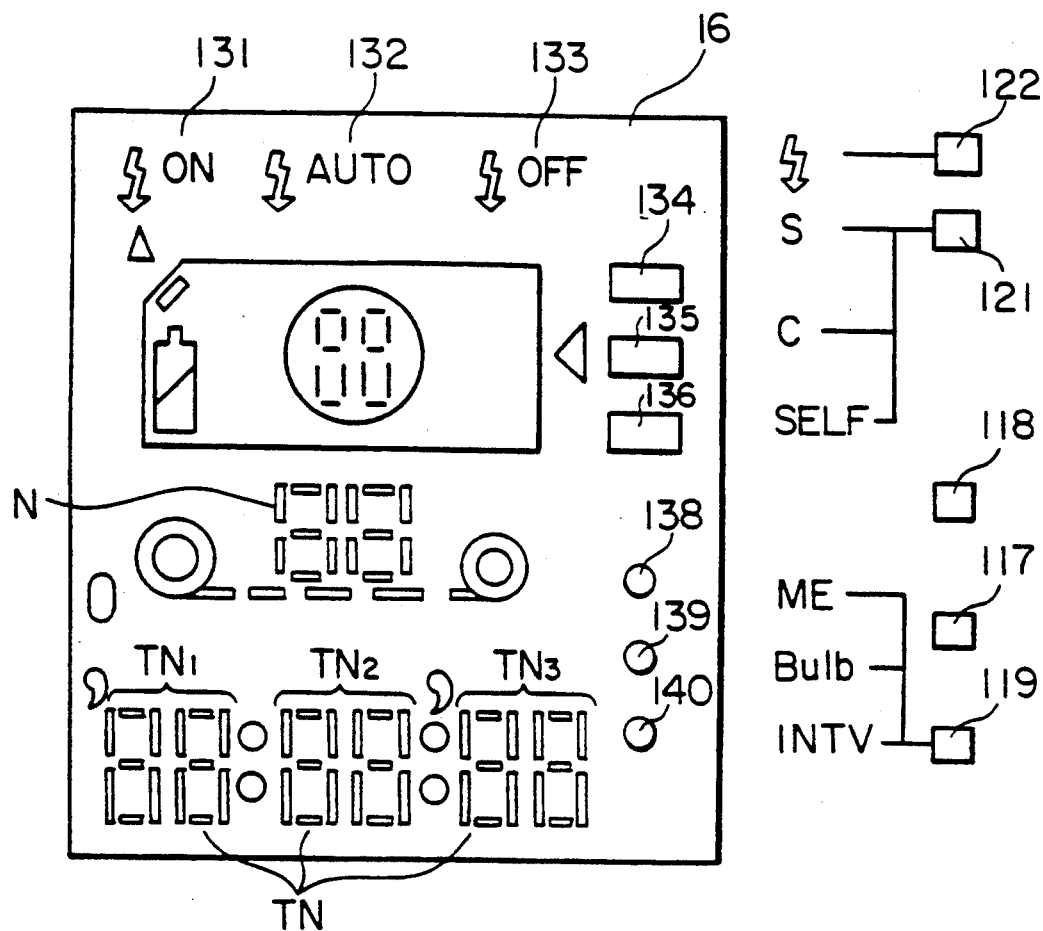
FIG. 5 schematically illustrates a display pattern of a liquid crystal display (LCD) 16.

FIG. 1 is a flow chart illustrating one preferred example of the invention, wherein the main operation of a microcomputer 11 is illustrated. FIG. 5 illustrates the layout of a display 16 and operation/control buttons of the camera according to the invention. In FIG. 5, numeral 122 represents a strobe flashing mode selection button to select a unconditional flash (ON) or a automatical flash (AUTO), according to the photometric information detected from a photometric device, or inhibition of its operation (OFF). Numeral 121 represents a drive mode selection button to select the single exposure mode (S) where each pressing of a release button allows exposure of one frame, or the continuous exposure mode (C) where plural frames are continuously exposed while the release button is pressed, or the self exposure mode (SELF) where exposure is performed by the self timer. Numeral 119 represents a function mode selection button to select one of the special exposure modes; the multiple exposure mode (ME) where one frame of film is subjected to a plural exposing, the bulb mode (Bulb) where exposure is performed with the bulb, and the interval mode (INTV) where independent frames are exposed at predetermined intervals. Numeral 118 represents an indicator selection button to choose if the designated data is to be modified. Any one of the special exposure modes is selected with the function mode selection button, while the data is on the exposure-frame counter N, or respectively on indicators $TN_1$, $TN_2$, and $TN_3$ of the multi-digit display TN that displays the current year, month, date, hours, minutes, seconds, and the like. Numeral 117 represents a display modification button to modify the data on a display that is selected with the indicator selection button 118. Numerals 131, 132, and 132 represent indicators respectively indicating, at the strobe-flashing mode, "unconditional flashing (ON)", "automatic flashing (AUTO)", and "inactive (OFF)". Numerals 134, 135, and 136 represent indicators respectively indicating a present drive mode such as "single exposure mode (S)", continuous exposure mode (C)", and "self exposure mode (SELF)". Numerals 138, 139, and 140 represent indicators respectively indicating a present special exposure mode such as "multiple exposure mode (ME)", "bulb mode (Bulb)", and interval mode (INTV)".

For changing the present drive mode in the camera of this embodiment, the drive mode selection button 121 is manipulated in order to rotate it from single exposure mode "(S)", to continuous exposure mode "(C)", self exposure mode "SELF", and then back to single exposure mode "(S)". Depending on the drive mode selected, one of the indicators 134, 135, and 136 lights to indicate a relevant drive mode.

In the picture-taking based on a special exposure mode, the camera exposure mode is recurringly changed by the manipulation of the function mode selection button depending on the number of times, starting from "regular exposing mode", "multiple exposure mode", "bulb mode", "interval mode," and then back to "regular exposing mode". In correspondence with the selected camera exposure mode by the function mode selection button 119, one of the indicators 138, 139, and 140 is turned on to indicate a present camera exposure mode. In the regular exposing mode, where any of the special exposure modes are inactive, the indicators 138, 139, and 140 are all turned off.

Next, the mode setting operation at the interval mode is hereunder described. First, using the function mode selection button 119, the interval mode is selected. Once the interval mode is selected, the strobe mode is unconditionally set at "AUTO" mode. At the same time, the exposure-frame counter N on the display 16 changes its information from the number of exposed frames to the sign "02" with blinking to indicate two frames (minimum possible frames at the interval mode), while the indications on $TN_1$, $TN_2$, and $TN_3$ of the multi-digit numerical display TN are changed to "00"s from the current year, month and date.

The blinking indication of the exposure-frame counter N indicates that data modification with the data modification button 117 is allowable. At this state, by manipulating the data modification button 117 a frame number to be exposed in the interval mode can be set, while the exposure-frame counter is monitored. Once the number of exposure frames in the interval mode is set, manipulation of the indicator selection button 118 can change the indication of the exposure-frame counter N from blinking to sustaining, and the current hour indicator "$TN_1$" on the multi-digit display blinks to show that data modification is allowable. Then, likewise, time-interval settings in the interval mode are performed up to that of the indicator $TN_3$. Once the data for the indicator $TN_3$ is set and the indicator selection button 118 is manipulated again, the indication of the indicator $TN_3$ changes from blinking to sustaining. Thus exposure conditions in the interval mode have been completely set, thereby the exposure in the interval mode becomes ready.

If an exposure interval setting based on the interval mode range from "00,00,00" to "00,00,07", or from 0 to 7 seconds is selected and the indicator selection button 118 is manipulated, the minimum interval in the mode of 8 seconds, is unconditionally selected, thereby the blinking indication of "00,00,08" appears on the multi-digit display TN. The strobe mode can be modified even after selection of a relevant interval mode. The above-mentioned minimum interval of 8 seconds depends on the time for charging the strobe, winding the film, and the like. Therefore, this 8 seconds interval is not mandatory but it is also possible to provide the different minimum intervals depending on whether or not the strobe is used.

The above description referred to one setting operation in the interval mode, as example. Similar to the operation in the interval mode, once the bulb mode is selected with the function mode selection button, the strobe mode is automatically canceled (OFF), and the indicator $TN_1$ blinks to indicate that data modification with the data modification button is allowable. Once the time setting "00,00,00" is selected, the minimum exposure time in the bulb mode of "00,00,01" or one second is unconditionally selected.

Next, using FIG. 1, the controlling operation of microcomputer 11 is hereunder described.

Based on the manipulation of the function mode switch 19, the microcomputer 11 judges the present mode selected from the multiple exposure mode, bulb mode, and interval mode (Step 1S1). In the bulb mode, the multi-digit display TN on the LED 16 changes its indication from a date to a bulb time (Step 1S2). When a photographer sets a bulb time (hours, minutes, and seconds) with the select switch 18 and the adjust switch 17, the microcomputer changes the display TN to a corresponding indication (Step 1S3), and stores the present time (Step 1S4). Then, as the release button is pressed (1S5), the display TN starts indicating the time left for the bulb exposure (Step 1S6), and the time counted down with an internal timer (Step 1S7). When a one second predetermined time span remains (Step 1S8), the microcomputer changes the display TN to indicate an imprinting date (Step 1S9), waits until "timer over" state occurs (Step 1S10), and starts the termination process such as exposure control and film winding (Step 1S11).

In the bulb mode, as described above, only bulb time indications are available in the course of both bulb time setting and countdown bulb operation. Meanwhile, one second before elapse of the predetermined time span, the time indication is replaced with an indication of a imprinting date, thereby the remaining time of the bulb operation can be read with the indication of the display TN even during the bulb operation. In the above description, the indication of the bulb operation time is changed to the imprinting information at one second before the completion of a countdown. However, this indication timing can be arbitrarily changed depending on the response duration of the display 16 to an actual imprinting operation.

Next, upon initiation of the interval mode, the indicator N on the display 16 changes its indication from the present frame position to the number of exposed pictures, and the display TN changes its indication from the current date to the interval time (Step 1S21). When a photographer sets an exposing number and an interval time (hours, minutes, and seconds) with the select switch 18 and the adjust switch 17, the microcomputer modifys the indications on the indicator N and display TN (Step 1S22), and stores the set time (Step 1S23). Then, by the manipulation the release button (Step 1S24), the indicators N and TN respectively start displaying the numbers of exposed pictures the interval time (Step 1S25), and a countdown by the timer. (Step 1S26). One second before the completion of counting (Step 1S27), the indicator TN is manipulated to change its indication to the imprinting date (Step 1S28), "time over" is detected (Step 1S29), exposure is controlled, the predetermined number of pictures in the memory is decremented by one, the film is correspondingly wound one frame (Step 1S30), and the processing returns to Step 1S25 if the predetermined number of frames have not been exposed (Step 1S31); thereby the interval time and the number of exposed pictures are indicated again. Once the predetermined number of frames are exposed, the processing returns to the main routine.

In the interval mode, as described above, even when the interval time and the number of exposed pictures are being set or the countdown of the interval operation is active, the time and the number of pictures, both related to the interval operation, are displayed; and indication of the imprinting date appears one second before the predetermined interval has elapsed. Therefore, even during the interval operation, the remaining time and the number of exposed pictures can be read with the display TN and indicator N.

With the camera of the present embodiment, after the exposure conditions in the interval mode are set, by mainpulation of the release button, exposures at the set intervals automatically proceed until the predetermined number of pictures are taken. Once the designated final frame is exposed, the camera exposure mode automatically returns to the regular exposing.

In the interval mode, if a set number of the pictures to take is greater than the number of unexposed frames of the film in the camera, the number of remaining frames is unconditionally set as the number of pictures to take in the interval mode, comparing the number of remaining unexposed frames detected from the DX code of the loaded film, with the number of frames already exposed before the interval mode is selected.

Detection of the number of unexposed frames can be performed without the DX code. For example, in the case of a pre-winding type camera (camera having a constitution that the film is wound up to the final frame as a film is loaded into the camera, and the film is wound back into a Patrone frame by frame), the number of available frames is recorded in the process of the winding-up operation, and the number is used for the calculation of the remaining frames. In the case that the set number of the frames to expose in the interval mode is greater than that of remaining frames, instead of the unconditional setting of the number of pictures to take according to the remaining frames, the film frame counter N or an indicator 140 can be design to blink for warning; or otherwise, the release button can also be designed to be locked for inhibition of the exposure.

Referring to the flowchart in FIG. 2-a, battery check control with the microcomputer 11 is described. The microcomputer 11, based on the manipulation of the function mode switch 19, judges the present mode selected from the multiple-exposure mode, bulb mode, and interval mode (Step 2S1). In the interval mode, a photographer sets the number of pictures to take and the interval time (hours, minutes, and seconds) (Step 2S2), with the select switch 18 and the adjust switch 17, and based on indications on the LED 16, where by, the microcomputer stores the number of frames and the time (Step 2S3). Then, by the mainpulation of the release button (Step 2S4), the present battery voltage is acknowledged in the form of digitized data (Step 2S5), and a battery check operation starts. First, the present battery voltage level is checked to determine if it exceeds the reference voltage level (Step 2S6). The reference voltage used for this purpose is set greater than a reference voltage level for a regular exposing operation. For example, while a reference voltage level for a regular exposing operation is 4.8 V, the reference voltage level of the interval mode is set at 5.0 V.

If the battery voltage level is lower than the reference voltage, incapability of the interval exposure if impossible is displayed (Step 2S7), and the present processing returns to the main routine by the return action of the release button to the original position (Step 2S8). If the battery voltage level is greater than the reference voltage level, the automatic focus controlling is initiated (Step 2S9), this controlling operation judges whether the focus is being locked at a shortest distance (Step 2S10). If the focus is not locked at the shortest distance, the interval time is set on the timer, and the timer starts counting the time (Step 2S11). Then, the remaining time is judged whether it is 8 seconds (Step 2S12), and strobe charging starts at the point that the left time reaches 8 seconds (Step 2S13). During strobe charging, the preset time is judged whether it is over (Step 2S14), and if the preset time comes near to be over, the battery charging is cancelled (Step 2S16). If strobe charging is completed before the preset time is over (2S14), further charging is interrupted (Step 2S17). Then, the timer is judged whether it finishes the counting (Step 2S17), and immediately before the completion of counting with the timer, focus controlling is performed (Step 2S18), and the focus is judged whether it is locked at the shortest distance (Step 2S19). If so, the focus lens is set at the shortest focusing range (Step 2S20); otherwise, the focus lens is set at a relevant distance, and the exposure controlling for the shutter and strobe is performed (Step 2S21). Then, the preset number of frames for interval exposure is judged whether it is exposed (Step 2S22). If the preset number of frames is not exposed, the processing returns to Step 2S11, thereby the timer restarts counting for next interval exposure; if the preset exposure sequence is completed, the processing returns to the main routine.

As in the description above, in the interval exposure operation, a battery check level is set greater than that of the regular exposure operation. Accordingly, in the course of interval exposure operation for the preset number of exposures at preset intervals, it is possible to inhibit and warn against exposure with a low battery level, thereby failure in picture taking is eliminated. On the other hand, since the battery check level is lower for the regular exposure operation, the battery is able to be used until the moment immediately before its power depletion, thereby a waste of useful batterys is eliminated.

Figure 6:
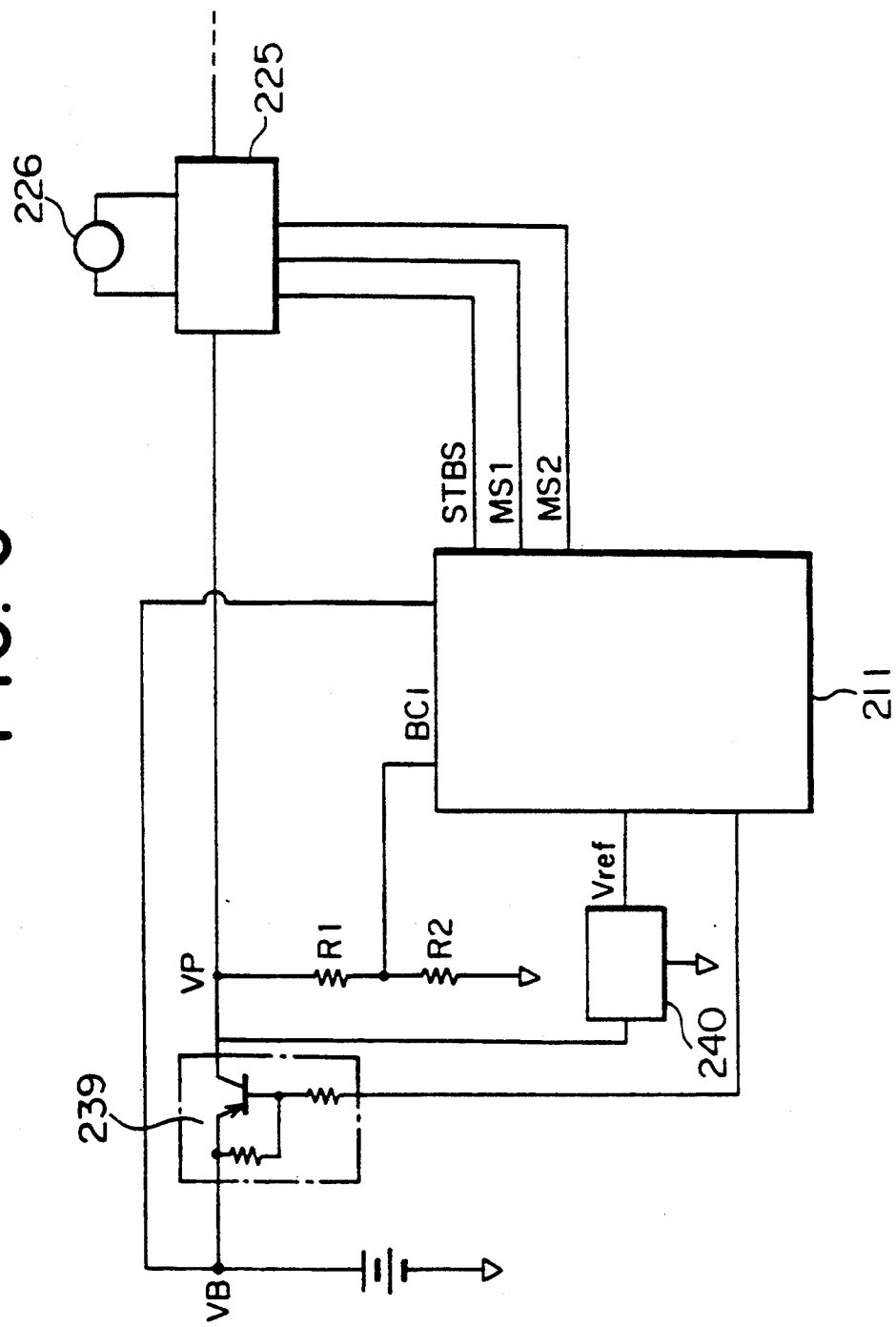
FIG. 6 is a schematic diagram showing a battery check circuit.

FIG. 6 illustrates in further detail the circuit for checking the battery voltage level.

In checking the battery voltage level according to the invention, correct evaluation is achieved by applying power to the circuit connected to a load.

This circuit is further described by using an example where the load is a shutter driving motor.

The shutter driving motor is controlled through a control IC device 225, while status of a control operation of the control IC device 225 depends on the control signals STBS, MS1, and MS2 from the microcomputer 211.

In other words, the IC device 225 performs controlling as summerized in the Attached Table 1.

TABLE

| STBS | MS1 | MS2 | Operation |
| --- | --- | --- | --- |
| 1 | * | * | Off |
| 0 | 0 | 0 | Brake |
| 0 | 0 | 1 | Brake |
| 0 | 1 | 0 | Reverse |
| 0 | 1 | 1 | Forward |

Symbol "*" means that solution is not limited to signal status

A battery check voltage entering operation with this control system is described in the attached flow chart FIG. 2-b (the detail flowchart corresponding to 2S5 in FIG. 2-a). In substep 1, MS1, MS2, and STBS are being reset in order to initiate loaded power application. In this example, the shutter motor is designed to rotate in the reverse direction. In this step, however, by an unshown shutter mechanism, the motor remains stationary. Correspondingly, a current for locking the shutter flows via the motor 226. Next, substep 2 that is a stand-by time counting process (this stand-by process is provided to stabilize the status of the battery immediately after the load (motor) is applied) is executed, where this status is maintained for 10 msec. Once this duration has elapsed, the current voltage level of the battery is converted from analog data into digital data. This A/D conversion operation is later described in further detail. Next, to apply brake to the motor, the control process in Step 4 is performed. To continuously hold the brake of the motor for 3 msec., substep 5 is incorporated, and, finally, STBS is set to 1 level, thereby the control IC device 225 is turned OFF.

Next, the battery check voltage entering operation is hereunder described in detail. In the FIG. 6 as designated at 239:

$$V_P \approx V_B$$

$$BCI = R2 \times V_P/(R1+R2)$$

Assuming that R1=30 kΩ and R2=10 kΩ, then $BCI = (\frac{1}{4}) \cdot V_P$

Once BCI is converted from analog data into digital data by an A/D converter in the microcomputer based on Vref as a reference voltage (the reference voltage signal is generated by a reference voltage generator 240 in this figure), accordingly:

Digital value $= (BCI/V_{ref}) \times 255 = (255/(2.04 \times 4)) \times V_P$

Using, for example, such 8-bit digital data for an A/D conversion operation, the status of the battery can be categorized as Table 2 based on the status of Vp, provided that Vref=2.04 V and numeral 255 corresponds to FF in hexadecimal notation represented by 8-bits digital data.

TABLE 2

| VP (≈VB) | BCI | Digital value | Normal exposure | Interval exposure |
| --- | --- | --- | --- | --- |
| ~5.3 | ~1.33 | ~166 | Full | Full |
| 5.3~5.0 | 1.33~1.25 | 165~157 | ↓ | ↓ |
| 5.0~4.8 | 1.25~1.2 | 156~150 | Warning | Locked |
| 4.8~ | 1.2~ | 149~ | Locked (inhibited) | Locked (Inhibited) |
| (V) | (V) | | | |

Accordingly, in an exposure operation other than the interval exposure operation, exposure is enabled when the battery voltage level is 4.8 V or higher (though, warning can be issued in compliance with a specific requirement).

In contrast, in the time of the interval exposure operation, exposing is judged to be inhibited, and this state is displayed (process control from Step 2S6 to Step 2S8 in FIG. 2-a).

According to the present embodiment of the invention, the example used is a camera that exposes a first frame by the manipulation of the release button. However, the first frame can be designed to be exposed after elapse of a predetermined interval time by the mainpulation of the release button. In the latter case, the shortest distance lock in the Step 3S10 is preferably eliminated.

The embodiment is also typified as the case where the reference voltage level for the interval exposure operation is maintained unchangeably. Optionally, another arrangement is available for ensuring an efficient picture-taking as well as for an efficient use of batteries, by a structure setting different levels of the interval time and the number of exposing frames either for each preset frame or group of frames. The efficient picture-taking and use of batteries can be also realized by a structure setting, an appropriate power (for example, based on the assumption that all exposures are performed by using the strobe) for an exposure operation, by either arithmetical determination or estimation from the previously stored data according to the interval time and the exposing frame number set in the interval mode, wherein the battery check level used in this interval exposure operation is determined by compensating a losing voltage caused by power consumption in an interval exposure operation, to the regular battery check level voltage.

FIG. 3 is a flow chart of the main part of embodiment of the invention that uses a microcomputer 11 and is capable of the interval picture-taking with appropriate focusing. The microcomputer 11 acknowledges the present mode selected from the multiple exposure mode, bulb mode, and interval mode by the manipulation of a function mode switch 19 (Step 2S1). In the interval mode, using the select switch 18 and the adjust switch 17, a photographer sets the number of pictures to take and the interval time (hours, minutes, and seconds) on the LCD 16 (Step 3S3), whereby, the microcomputer 11 stores the number of frames and the time (Step 3S3). Then, the release button is pressed (Step 3S4), the present battery voltage level is checked (Step 3S5), and the distance to the object is measured with an automatic focusing control IC 31 (Step 3S6). In this operation, the distance that the IC device 31 indicates is judged whether it is subjected to the short distance lock (an operation for the situation that the distance to a subject is shorter than the minimum exposure range) (Step 3S7). If the distance is judged to be subjected to the short distance lock, picture-taking is inhibited, and warning is issued, so that a photographer can change the camera position (Step 3S8). As one example of the warning, it may be preferable to flicker a LCD figured in "N" within the finder. Once the release button returns to the original position (Step 3S9), the processing returns to Step 3S4. If the judgement of Step 3S7 is not subjected to the short distance lock, a timer is set for the interval time, and the timer starts counting down the set time (Step 3S10). In this case, for the first photograph in the interval mode, it may be possible to carry out the exposure right after Step 3S7 without counting over. Thus, it may be preferrable to provide a means for selecting either mode for the first photograph. Next, the microcomputer 11 waits for the timer to be over (Step 3S11), and immediately before the time-over, distance-finding is performed (Step 3S12). Then, the present state is judged again whether the short distance lock is performed (Step 3S13). If the present status is subjected to the short distance lock, the lens focus is set to the shortest focal distance. If the present status is not the short distance lock, the microcomputer 11 controllingly adjusts the lens focus to the relevant distance, controls the strobe, returns the lens to the initial position, and controllingly forwards the film for one frame (Step 3S15). Then, the computer judges whether the interval exposure finishes up to the predetermined number of frames (Step 3S16). If it is not finished, the processing returns to Step 3S10, where the timer restarts to prepare for the next interval exposure operation. If it is finished, the processing returns to the main routine.

As described above, in the interval exposure operation, once the release button is pressed to start the operation, distance-finding is performed first, and the short distance lock is judged whether it is performed. Based on the resultant judgement, warning and exposure-inhibition are performed in the case of short distance lock, in order to let a photographer adjust the camera position again. Once the microcomputer starts controlling the interval exposure and accordingly the timer, the lens position is adjusted to the minimum exposure range, if the present status is the shortest distance lock, thereby exposure operation is maintained until the preset number of frames are exposed, though some frame may have out-of-focus images.

Incidentally, in the above embodiment, in the time of judging the shorter distance lock in Step 3S7, it may be possible to cancell the photographing as shown in flow direction by 2S11, 2S7 and 2S8 in FIG. 2-a. However, it may be preferable to issue warning for a photographer as shown in FIG. 3. During the time of judging the shorter distance lock in Step 3S13, it may be possible to adjust the lens position at a hyper-forcal distance in place of the minimum exposure range.

As described above, according to the invention, the LCD has a dual-purpose display section that indicates both imprinting information and exposure-related information, wherein the exposure-related information is usually indicated and the imprinting information is not allowed to be indicated until immediately before the exposing, whereby a photographer can acknowledge the time elapsed in the interval mode, or the time left in the bulb mode, by referring to the indication of the display, from the initiation of exposure controlling until immediately before exposure starts. Additionally, according to this arrangement, the dual-purpose display simplifies the display constitution, and the automatic exchange of indication allows easy handlings of the camera.

According to the invention, with a camera capable of an interval exposure operation, the battery check level of the interval exposing is higher than that of the regular exposing, thereby the interval exposing is operated securely, and a waste of useful batteries is eliminated.

According to the invention, if a signal, that indicates a subject is within the minimum focal distance, occurs prior to the initiation of an interval exposing, the exposure control is cancelled and a warning is issued. If such a signal occurs after the similar initiation, the focus is unconditionally locked at the shortest distance. Accordingly, prior to the initiation of the interval exposing, the cancellation of the operation and warning allows a photographer to adjust the camera position. After the exposure starts, occurrence of pictures being out of focus is minimized; and in the course of exposure operation, a picture is taken at the minimum focus distance rather than skipped without exposing so that the exposure operation is maintained until the preset number of frames are exposed.

What is claimed is:

1. A camera being capable of operating in an interval mode in which a picture taking operation is repeated at a time interval for a number of frames, the camera comprising:
   a focus lens;
   distance measuring means for measuring the distance between a subject to be photographed and the camera; and
   control means for adjusting the focus lens to a predetermined focal point if the distance measuring means determines the distance between the subject and the camera to be less than a predetermined minimum distance when the interval mode is performed.

2. The camera of claim 1 wherein the predetermined focal point corresponds to the predetermined minimum distance.

3. The camera of claim 1 wherein the predetermined focal point a hyper-focal length.

4. The camera of claim 1, wherein in a first picture taking operation during the interval mode, the control means prevents the picture taking operation or issues a warning signal when the distance between the subject and the camera is determined to be less than a predetermined minimum distance.

* * * * *

UNITED STATES PATENT AND TRADEMARK OFFICE
CERTIFICATE OF CORRECTION

PATENT NO. : 5,166,721
DATED : November 24, 1992
INVENTOR(S) : Michiharu AKASAKA It is certified that error appears in the above-identified patent and that said Letters Patent is hereby corrected as shown below:

On the Title page, item [57],
Abstract, Line 2, before "normal" insert --in--;

Abstract, Line 4, before "interval" insert --in--;

Abstract, Line 5, change "with" to --within--; and

Claim 3, Column 14, Line 2, before "a" insert --is--.

Signed and Sealed this

Eleventh Day of January, 1994

Attest:

BRUCE LEHMAN

Attesting Officer        Commissioner of Patents and Trademarks